April 12, 1927.

C. JOHNSON

WEEDER ATTACHMENT FOR HARROWS

Filed Oct. 7, 1924

1,624,789

Inventor
Clarence Johnston.

Patented Apr. 12, 1927.

1,624,789

UNITED STATES PATENT OFFICE.

CLARENCE JOHNSTON, OF TOWNSEND, MONTANA.

WEEDER ATTACHMENT FOR HARROWS.

Application filed October 7, 1924. Serial No. 742,250.

The present invention has for its purpose to provide, in a weeder attachment for harrows, a construction especially adapted for application to a harrow a short distance therefrom and in such a manner so that it will not interfere with the functions of the harrow.

Another purpose is to provide a weeder including a bar with means for suspending the same on a harrow, with blades carried by the bar, and while the blades are designed to lie relatively flat on the ground, they are disposed on such angles as to permit the weeds to readily slip off.

Still another purpose is to provide means operatively connecting the teeth carrying bar and an operating lever mounted upon the harrow for raising and lowering the weeder into and out of engagement with the ground.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 1:
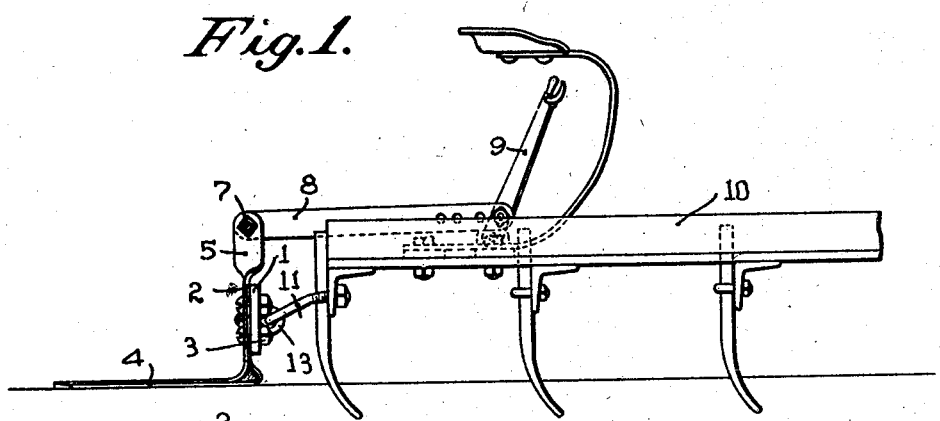
Figure 1 is a view in side elevation of a portion of a harrow with the weeder applied and illustrating the means for raising and lowering the weeder.
Figure 2:
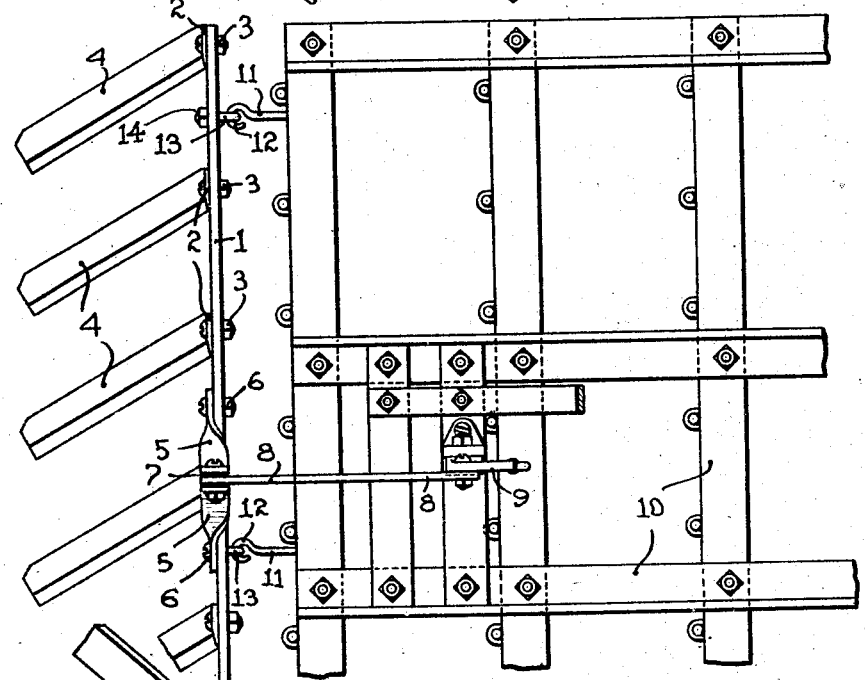
Figure 2 is a plan view.
Figure 3:
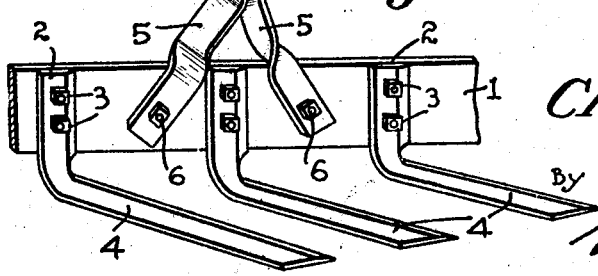
Figure 3 is a detail perspective view of a portion of the weeder, showing the suspension means for the tooth carrying bar and several of the teeth in order to show their relative positions on the bar.

Referring to the drawings, 1 designates a bar to which at spaced positions thereon weeding teeth 2 are secured by means of bolts or the like 3. These teeth extend downwardly and terminate in portions 4 which extend rearwardly of the perpendicular portions and while such portions lie relatively flat on the ground, they are disposed at angles to permit the weeds to slip readily thereover.

Link braces 5 are bolted or otherwise secured at 6 to the bar 1 and converge upwardly and have their adjacent ends connected at 7 to a link 8 which, in turn, operatively connects with a lever 9 operatively mounted on the harrow 10. By means of hanger hooks 11, the hooks 12 of which are connected to eyes 13 on the harrow, the bar 1 with its teeth is suspended from the harrow in a substantially horizontal position. The hanger hooks are connected at 14 to the bar between certain of the teeth.

The weeder is so mounted on the harrow as to travel in the rear and act to separate the weeds from the clods. However, if there are many rocks and large clods, a harrow should be operated several times over the field for breaking up the clods and working as many of the rocks to the side of the field as possible before using the weeder. By the use of the operating lever on the harrow, the weeder may be raised and lowered into and out of engagement with the ground, the raising of the weeder being necessary to permit the teeth to escape and pass over the large clods and rocks.

It will be noted that the teeth extend rearwardly and laterally at an angle to the bar 1 for the purpose of not only breaking up the clods but to remove the weeds from the clods and sweep them to one side of the path of travel of the harrow.

The invention having been set forth, what is claimed is:

In combination with a harrow, the latter being provided with rearwardly extending hanger hooks terminating in eyes, a weeder comprising a tooth carrying bar having eyes engaged with the eyes of the hanger hooks, a plurality of teeth mounted on said bar and having extending ground engaging portions, a latch controlled hand lever mounted on the harrow, a pair of brace members connected with said bar and extending upwardly therefrom, and a link having a pivotal connection at one end with the lever and at the other end being disposed between said brace members and pivotally connected therewith.

In testimony whereof he affixes his signature.

CLARENCE JOHNSTON.